March 5, 1935.   B. G. WARDENBURG   1,993,637
RECORDING THERMOMETER
Filed March 3, 1932   2 Sheets-Sheet 1

INVENTOR
BERNHARD G. WARDENBURG
BY HIS ATTORNEYS

Howson and Howson

Patented Mar. 5, 1935

1,993,637

UNITED STATES PATENT OFFICE 1,993,637

RECORDING THERMOMETER

Bernhard G. Wardenburg, Toledo, Ohio, assignor to Moto Meter Gauge & Equipment Corporation, Toledo, Ohio, a corporation of Delaware Application March 3, 1932, Serial No. 596,616

7 Claims. (Cl. 73—52)

This invention relates to recording thermometers, and more particularly to the type comprising a distance type temperature responsive mechanism and a recording mechanism, whereby a continuous record may be kept of temperature conditions at a point remote from the instrument.

Objects of the invention are to simplify and improve the construction and operation of instruments of this character, to reduce the friction of the parts of the temperature responsive mechanism to a minimum while insuring positive action thereof, and to render the same otherwise well adapted for the purposes set forth.

Figure 1:
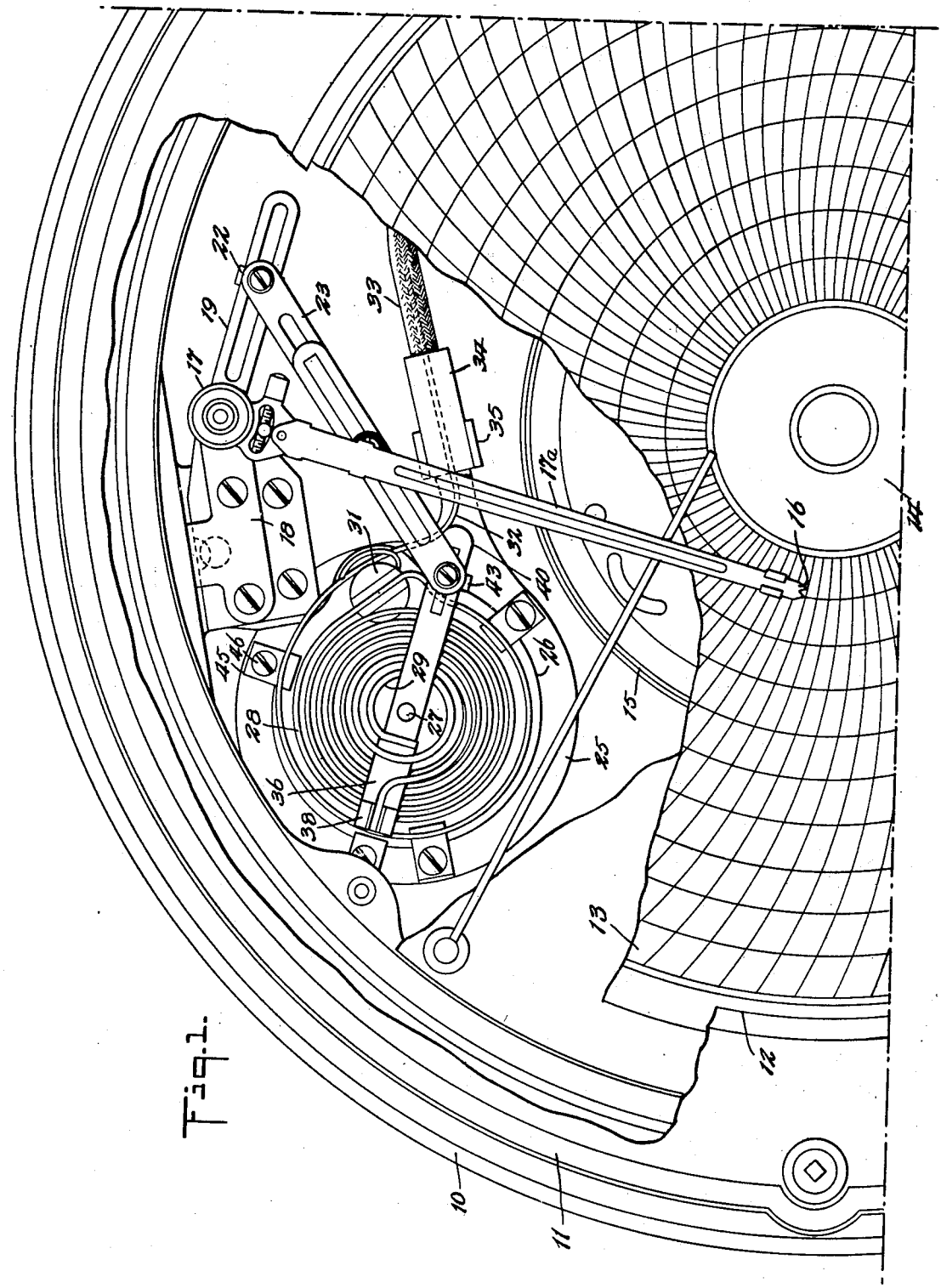
Figure 2:
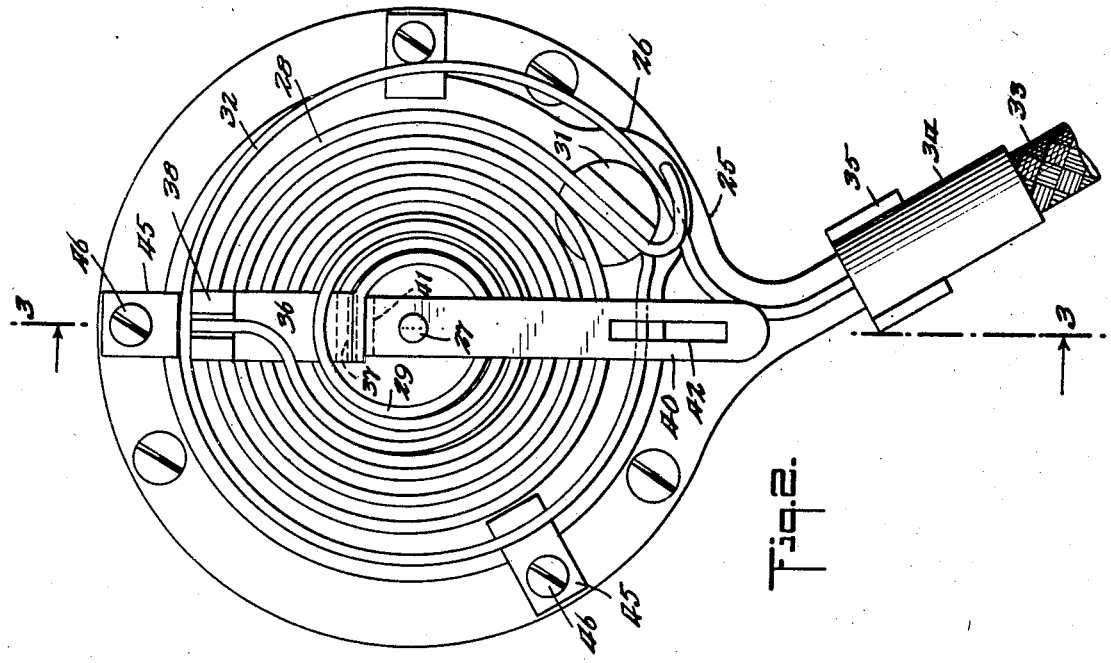
Figure 3:
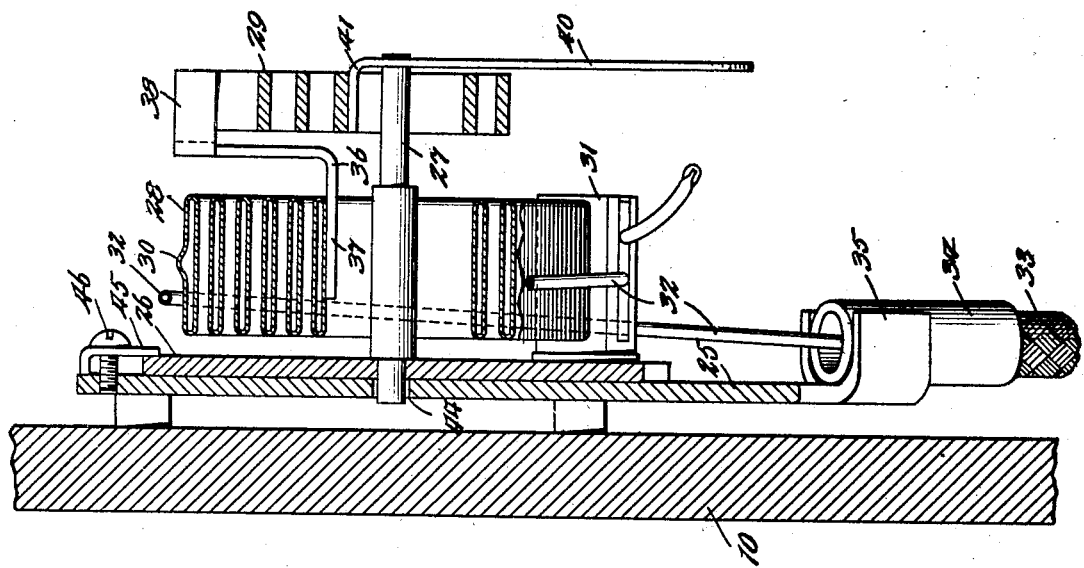

Other objects and features of novelty will be apparent as the following description proceeds, reference being had to the accompany drawings, in which Figure 1 is a partial elevation of a recording thermometer provided with a temperature responsive mechanism according to the preferred embodiment of the present invention, parts of the chart and casing being broken away to show the internal mechanism;

Figure 2 is an enlarged detail elevation of the temperature responsive mechanism shown in Figure 1; and Figure 3 is a section taken along the line 3—3 of Figure 2.

In Figure 1 a wall type of recording thermometer is shown, which comprises a circular casing 10 having a removable annular flange 11 at the front thereof, and defining a central circular opening 12 through which a chart 13 is visible. The chart 13 is detachably secured to a hub 14 which is driven at a uniform angular speed by clockwork contained in a casing 15.

The temperature is continuously recorded upon the chart 13 by a pen 16 carried by the outer end of a pen arm 17a. This pen arm comprises an angularly adjustable extension of one arm of a rock shaft 17 journaled on a bracket 18 secured to the rear wall of the casing 10. The other arm of the rock shaft 17 comprises a slotted portion 19 which is angularly disposed with respect to the pen arm 17a. A block 22 is slidable in the slot of the arm 19 and is pivoted to one end of an adjustable link 23. The other end of the link 23 is pivoted to a lever which is actuated by the distance type temperature responsive mechanism better shown in Figures 2 and 3.

Referring to these views, a supporting plate 25 is rigidly mounted on the rear wall of the casing 10. A base plate 26 is mounted on the supporting plate 25, and has rigidly secured thereto a fixed shaft 27. A Bourdon tube 28 and a bi-metallic compensating spring 29 are mounted coaxial with the shaft 27.

The Bourdon tube 28 is preferably flattened as shown, and provided with a reinforcing rib 30, which tapers from the fixed end of the Bourdon spring toward the free end thereof. The fixed end of the Bourdon spring is rigidly secured in a slotted post 31 mounted on the base plate 26.

The expansible fluid is supplied to the Bourdon tube 28 by a capillary tube 32, which is coiled once around the Bourdon spring and extends therefrom into a sheath 33, the end 34 of which is mounted in a clamp 35 carried by the supporting plate 25. The capillary tube 32 extends through the sheath 33 to a bulb located at the point remote from the instrument, where the temperature conditions occur which are to be recorded.

The Bourdon tube 28 and the compensating spring 29 are axially spaced along the shaft 27. This spacing permits them to be wound with relatively large inside and outside diameters. Thus the inner ends of both the Bourdon tube and the compensating spring are spaced from the shaft 27. This arrangement not only avoids friction, but also affords free operation of the inner ends about the shaft 27 concentrically therewith, and gives greater leverage and more positive operation.

As the outer end of the compensating spring is of greater diameter than the inner end of the Bourdon tube, a member 36 is provided therebetween for connecting these ends. This member 36 is preferably a sheet metal strip, the greater portion of which extends radially with respect to the shaft 27, but is out of contact therewith. The inner end of the member 36 is bent laterally and secured to the inner end of the Bourdon spring 28. The outer end of the member 36 is originally T-shaped, the wings 38 thereof being bent inwardly to secure the outer end of the compensating spring 29 therebetween.

A lever 40 is journaled on the outer end of the fixed shaft 27 and has an arm 41 bent inwardly and secured to the inner end of the compensating spring 29. The outer end of the lever 40 is slotted as at 42 to receive a block 43 which is pivoted to the end of the lever 23 shown in Figure 1.

From the foregoing description it will be apparent that the base plate 26, fixed shaft 27, Bourdon tube 28, compensating spring 29 and operating lever 40, together with the capillary tube 32 and the sheath 33 constitute an assembly unit which is supported by the supporting plate 25.

In the manufacture of the thermometer, the end 34 of the sheath 33 is permanently secured in the clamp 35, and the base plate 26 is located on the plate 25 by means of the inner end of the shaft 27, which projects from the base plate 26 through an aperture 44 in the supporting plate 25.

Thus, to adjust the instrument for a zero reading, the base plate 26 may be angularly adjusted with respect to the supporting plate 25. This adjustment is permitted by the movement of the base plate 26 about the aperture 44, the base plate 26 being maintained in the adjusted position by means of clips 45 which extend over the outer edges thereof and are secured to the base plate 25 by screws 46.

It should be noted that the journal of the lever 40 on the shaft 27 is small, and results in a minimum amount of friction, there being no frictional contact of either the Bourdon spring 28 or the compensating spring 29 with the shaft 27. At the same time, this journal of the lever 40 insures a positive action thereof. In this manner both minimum friction and positive action of the temperature responsive mechanism are secured.

I claim:

1. In a distance type thermometer, a fixed shaft, a Bourdon tube and a compensating spring each spirally wound and concentric with said shaft, a post in which the outer end of said Bourdon tube is mounted, means connecting the inner end of said Bourdon tube to one end of said compensating spring, a lever journaled on said shaft and connected to the other end of said compensating spring, and means for securing said post in selected positions angularly adjusted about the axis of said shaft.

2. In a distance type thermometer, a base plate, a fixed shaft extending outwardly from said base plate, a Bourdon tube and a compensating spring spirally wound about said shaft and in spaced relation thereto, a lever journaled on said shaft and having an arm extending outwardly therefrom and secured to one end of said compensating spring, means connecting the other end of said compensating spring to one end of said Bourdon tube, and means for rigidly securing the other end of said Bourdon tube to said base plate.

3. In a distance type of thermometer, a base member, a fixed shaft projecting from said base member, a Bourdon tube and a compensating spring each spirally wound and concentric with said shaft and in spaced relation thereto, the outer end of said Bourdon tube being secured to said base member, a connecting member secured to the inner end of said Bourdon tube and extending outwardly therefrom and secured to the outer end of said compensating spring, and a lever journaled on said shaft and having a portion secured to the inner end of said compensating spring.

4. In a distance type thermometer, a base member, a fixed shaft projecting from said base member, a Bourdon tube and a compensating spring each spirally wound and concentric with said shaft, the outer end of said Bourdon tube being secured to said base member, the outer end of said compensating spring being spaced a greater radial distance from said shaft than the inner end of said Bourdon tube, a connecting member having a portion secured to the inner end of said Bourdon spring and another portion secured to the outer end of said compensating spring, and a lever journaled on said shaft and having a portion secured to the inner end of said compensating spring.

5. In a distance type of thermometer, a base, a fixed shaft extending outward from said base, a Bourdon tube spirally wound about said shaft and in spaced relation thereto and having a fixed outer end secured to said base, and an inner free end adapted for rotary movement about said shaft, a compensating spring spirally wound about said shaft and in spaced relation thereto and having an outer end adapted for rotary movement about said shaft, an arm pivoted on said shaft and having a portion secured to the inner end of said compensating spring, and means rotatable about said shaft but independent thereof and connecting the iner end of said Bourdon tube with the outer end of said compensating spring.

6. In a distance type thermometer, a support having an aperture, a base plate adjustably mounted on said support, a shaft carried by said base plate having one end projecting into said aperture, means carried by said support for maintaining said base plate in selected angularly adjusted positions about said aperture, a post on said plate, a Bourdon tube and a compensating spring spirally wound about said shaft, the outer end of said Bourdon tube being secured to said post, said compensating spring having an outer end connected to the inner end of said Bourdon tube, and a lever journaled on said shaft and having an end connected to the inner end of said compensating spring.

7. In temperature responsive mechanism, a pivoted lever, a Bourdon tube and a compensating spring each spirally wound and concentric with the axis of said lever, the inner end of said Bourdon tube being nearer said axis than the outer end of said compensating spring, means connecting said ends, and means connecting the inner end of said compensating spring to said lever.

BERNHARD G. WARDENBURG.